United States Patent [19]
Anderson et al.

[11] Patent Number: 5,973,473
[45] Date of Patent: Oct. 26, 1999

[54] MOTOR CONTROL CIRCUIT

[75] Inventors: Jason S. Anderson, Rochester; John E. Durkee, Wayland, both of N.Y.

[73] Assignee: Therm-O-Disc, Incorporated, Mansfield, Ohio

[21] Appl. No.: 08/742,941

[22] Filed: Oct. 31, 1996

[51] Int. Cl.[6] .................................................. H02P 1/42
[52] U.S. Cl. ........................ 318/785; 318/751; 318/788
[58] Field of Search .................................. 318/778–793, 318/749–756

[56] References Cited

U.S. PATENT DOCUMENTS

| | | |
|---|---|---|
| 3,414,789 | 12/1968 | Prouty . |
| 3,740,631 | 6/1973 | Fricker et al. . |
| 4,047,082 | 9/1977 | Scheuer et al. . |
| 4,375,613 | 3/1983 | Fuller et al. . |
| 4,605,888 | 8/1986 | Kim . |
| 4,622,506 | 11/1986 | Shemanske et al. . |
| 4,658,195 | 4/1987 | Min . |
| 4,804,901 | 2/1989 | Pertessis et al. . |
| 4,843,295 | 6/1989 | Thompson et al. ...................... 318/779 |
| 5,589,753 | 12/1996 | Kadah et al. ........................... 318/785 |
| 5,689,168 | 11/1997 | Bogwicz et al. ........................ 318/772 |

*Primary Examiner*—David Martin
*Attorney, Agent, or Firm*—Harness, Dickey & Pierce, P.L.C.

[57] ABSTRACT

A control circuit that activates and deactivates a motor start winding at different motor rpm trip points provides improved accuracy in the trip points by automatically compensating for changes in motor current caused by variations in line voltage and motor winding temperature.

6 Claims, 4 Drawing Sheets

MOTOR CONTROL CIRCUIT

BACKGROUND OF THE INVENTION

This application relates to the art of motor control circuits and, more particularly, to control circuits for motor start windings. The invention is particularly applicable for use with capacitor start motors and will be described with specific reference thereto. However, it will be appreciated that the invention has broader aspects and can be adapted for use with other motors such as split phase induction motors.

A motor start winding is activated to start a motor and is deactivated when the motor reaches operating speed. The motor then continues to operate on the main or run winding, and the start winding is reactivated if additional motor torque is needed for a motor load that causes a significant reduction in motor speed. The start winding may be reactivated and deactivated frequently during normal operation of the motor.

Historically, activation and deactivation of the start winding has been accomplished with centrifugal switches and mechanical relays. Replacement of such devices with electronic controls provides improved life and reliability, along with reduced size and weight. However, it is difficult to maintain reasonable accuracy of the motor rpm trip points at which the start winding is activated and deactivated because the motor current varies with variations in line voltage and motor winding temperature. It would be desirable to have an electronic control arrangement that compensates for such variations and provides improved accuracy of the motor rpm trip points.

It is sometimes desirable to adjust the motor speeds at which the start winding is deactivated and reactivated. Adjustment of centrifugal switches to change the motor rpm trip points is cumbersome and difficult to accomplish with reasonable precision because it concerns adjustment of movable parts and spring tension. It would be desirable to have an electronic circuit that provides a simplified and more accurate way of adjusting the motor rpm trip points.

SUMMARY OF THE INVENTION

The control circuit of the present application makes use of the correlation between motor current and motor speed for activating and deactivating a motor start winding. The control circuit indirectly measures motor current by monitoring the voltage produced by motor current running through a sense resistor. This monitored voltage correlates to motor speed because it correlates to motor current which in turn correlates to motor speed.

The control circuit monitors a reference value that correlates to the voltage of the power supply for the motor. In a preferred arrangement, the reference value is a reference voltage derived from the motor power supply voltage through a voltage divider.

The control circuit monitors a sensed value that correlates to motor current. In a preferred arrangement, the sensed value is the voltage produced by motor current running through a sense resistor in series with the motor.

The reference voltage varies with power supply voltage variations to maintain a substantially constant ratio of reference voltage to power supply voltage. The sensed voltage also varies with power supply voltage variations because motor current varies with power supply voltage variations. Such changes in motor current vary the voltage drop across the sense resistor through which motor current runs.

The variations in the reference voltage and the sensed voltage due to power supply voltage variations are substantially proportional. For example, an increase in power supply voltage that increases the reference voltage causes a corresponding and proportional increase in the sensed voltage. The reference and sensed voltages are compared with one another to control the start winding, and the variations in these compared voltages due to power supply voltage variations provides the control circuit with automatic compensation for power supply voltage variations. In other words, the motor rpm trip points for activating and deactivating the start winding are substantially unaffected by changes in motor current that are caused by variations in power supply voltage.

The sense resistor used to provide the sensed voltage is positioned so that its temperature correlates to the temperature of the motor windings. In a preferred arrangement, the sense resistor is positioned for exposure to substantially the same temperature as the temperature of the motor windings. The sense resistor preferably is positioned inside of the motor housing in close proximity to the motor windings, most preferably embedded in or otherwise in engagement with the motor windings. However, it will be appreciated that other locations are possible, including locations external of the motor housing.

Temperature variations in the motor windings cause changes in motor current without appreciably affecting motor speed. If the sensed value that is correlated to motor current were to vary with motor current changes brought on by temperature variations, the motor rpm trip points would be less accurate.

Automatic compensation for motor current changes with temperature is provided by positioning the sense resistor for exposure to substantially the same temperature as the motor windings. The resistance changes in the motor windings and the sense resistor will be substantially proportional. Motor current changes due to motor winding temperature variations result in corresponding changes in current through the sense resistor without appreciably affecting the voltage drop across the sense resistor because of the resistance change in the sense resistor. The current decreases with increasing resistance in accordance with ohms law which states that V=IR where V is the voltage, I is the current and R is the resistance. Therefore, the voltage drop across the sense resistor remains substantially constant with motor current changes that are caused by motor winding temperature variations and that do not appreciably affect motor rpm.

In a preferred arrangement, the sense resistor is a short length of wire. In an arrangement that has been tested, the wire was a 15 inch length of 18 gauge copper wire in accordance with American Wire Gauge Standards. However, it will be appreciated that other wire lengths, gauges and metals can be used.

The reference and sensed values provide reference and sensed inputs to a comparator having a comparator output that switches between high and low states to activate and deactivate the motor start winding. The comparator output is in one of its high and low states when the reference input is greater than the sensed input, and is in the other of its high and low states when the reference input is less than the sensed input. In an arrangement that has been tested, the start winding is activated when the comparator output goes high and is deactivated when the comparator output goes low. The comparator output goes high when the sensed input to the comparator is higher than the reference input, and goes low when the sensed input is lower than the reference input.

The sensed value across the sense resistor is amplified to provide the sensed input to the comparator. An amplifier gain adjuster is on when only the main winding is active and is off when both the start and main windings are active. This increases the amplifier gain when only the main winding is active and the motor current is lower.

For a given magnitude of the sensed value across the sense resistor, the magnitude of the sensed value input to the comparator is determined by the amplifier gain. Changing the magnitude of the sensed value input for any given sensed value across the sense resistor will change the motor speed at which the start winding is deactivated and reactivated. Adjusting the amplifier gain will adjust the magnitude of the sensed value input and this is easily accomplished by changing the value of two resistors in the amplifier/gain adjuster circuits. This allows quick and reasonably accurate adjustment of the motor rpm trip points at which the start winding is deactivated and reactivated.

It is a principal object of the present invention to provide an improved motor control circuit.

It is another object of the invention to provide an improved electronic control circuit for controlling a start winding of a capacitor start motor.

It is also an object of the invention to provide an improved arrangement for sensing the motor current running through a motor and to compensate for variations in that current due to temperature variations.

It is a further object of the invention to provide a motor control circuit that automatically compensates for motor current changes that are caused by variations in power supply voltage.

It is an additional object of the invention to provide an improved electronic motor control circuit that provides improved accuracy in the motor rpm trip points at which a motor start winding is activated and deactivated.

It is also an object of the invention to provide an electronic motor control circuit that is easily modified to change the motor rpm trip points at which the motor start winding is deactivated and reactivated.

It is another object of the invention to provide an electronic motor control circuit with an amplifier that has different gain related to the active motor windings and having easily modified gain for changing the motor rpm trip points at which the start winding is deactivated and reactivated.

DESCRIPTION OF A PREFERRED EMBODIMENT

Figure 1:
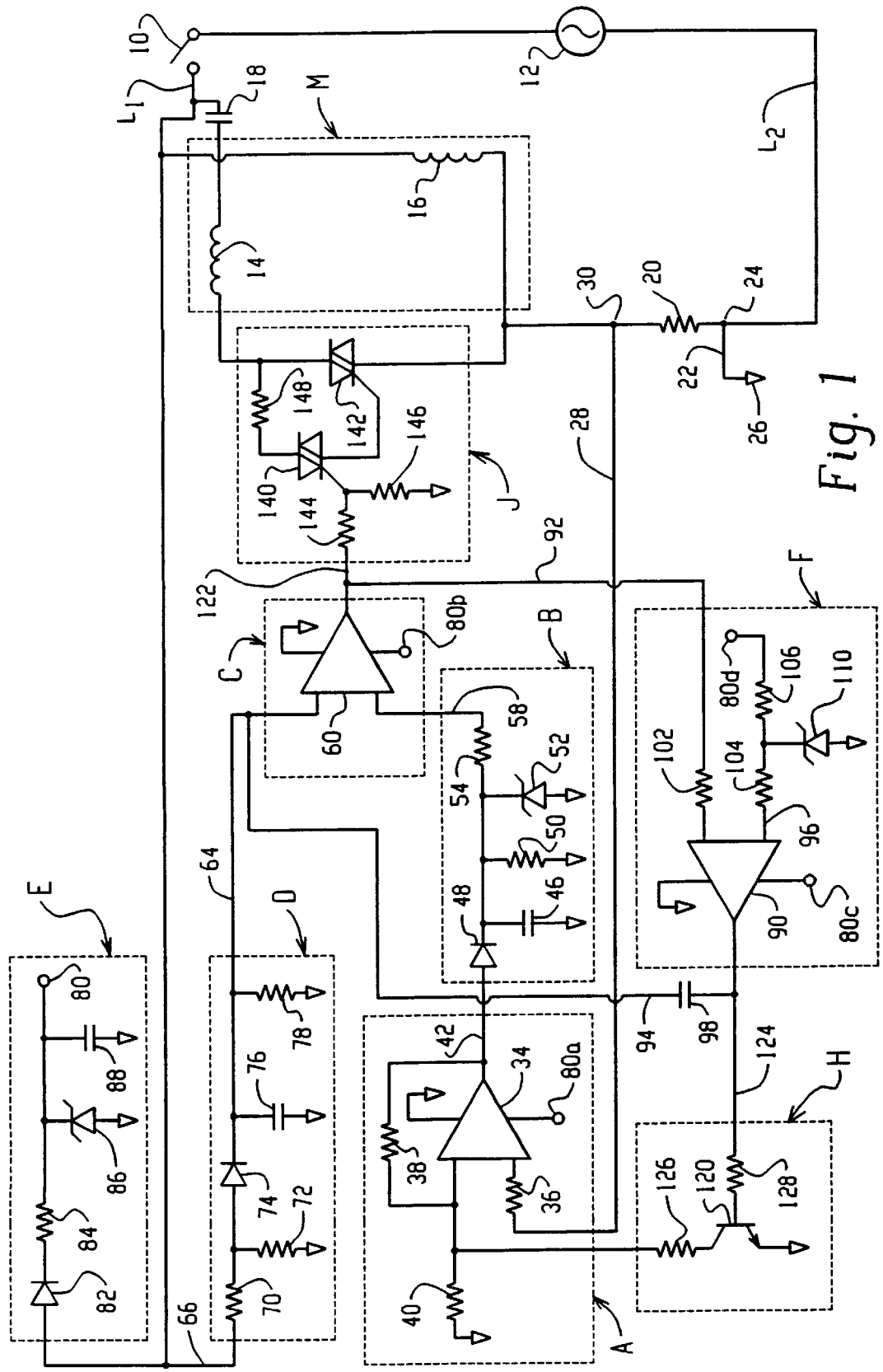
FIG. 1 is a schematic of a control circuit in accordance with the present application.

Referring now to the drawing, wherein the showings are for purposes of illustrating a preferred embodiment of the invention only and not for purposes of limiting same, FIG. 1 shows a capacitor start motor M connected through a switch 10 across lines L1 and L2 of an alternating current power supply 12. Motor M has start and main windings 14, 16, and a capacitor 18 in series with start winding 14 provides a phase displacement of approximately 90° between the start and main winding currents.

A sense resistor 20 connected in series with motor M comprises a short length of wire. In an arrangement that has been tested, the wire comprised a 15-inch length of 18 gauge copper wire, with the wire gauge corresponding to American Wire Gauge Standards. It will be recognized that other wire lengths, gauges and metals could be used. The sense resistor could also take forms other than a wire, and devices other than resistors could be used for measuring motor current.

Figure 2:
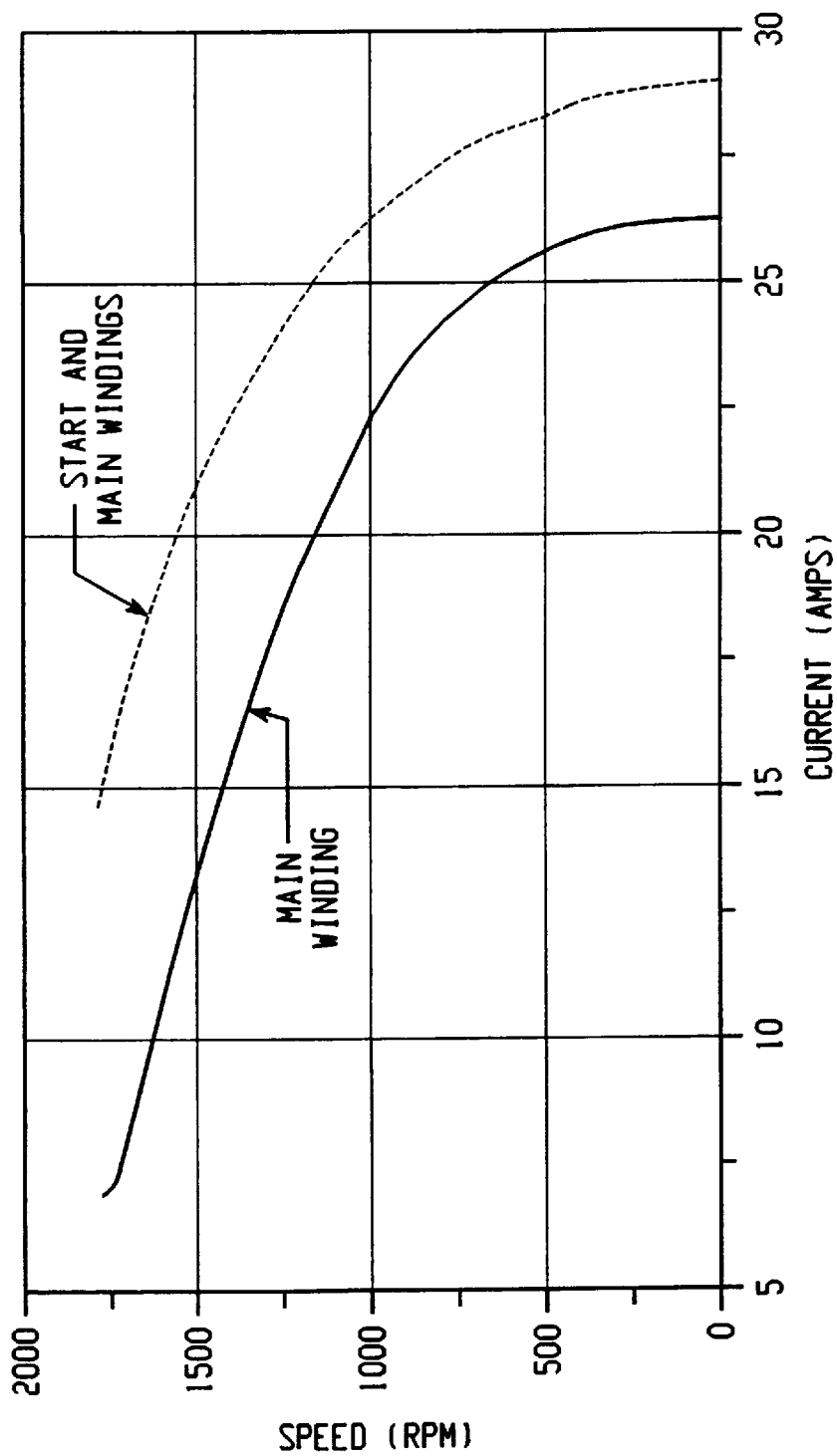
FIG. 2 is a graph showing the relationship between motor current and motor speed at a temperature of 25° C.
Figure 3:
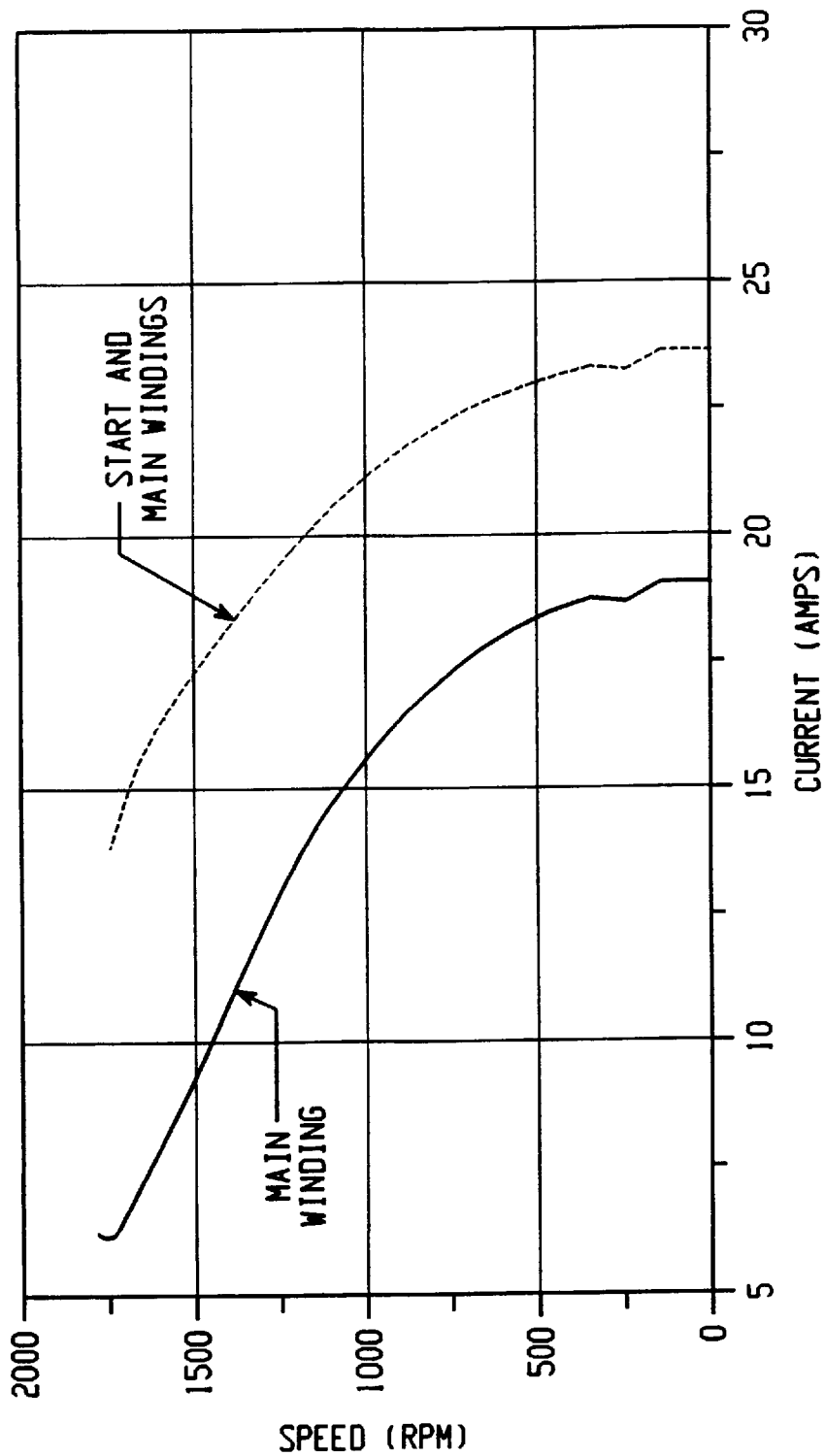
FIG. 3 is a graph similar to FIG. 2 and showing the relationship at a temperature of 130° C.
Figure 4:
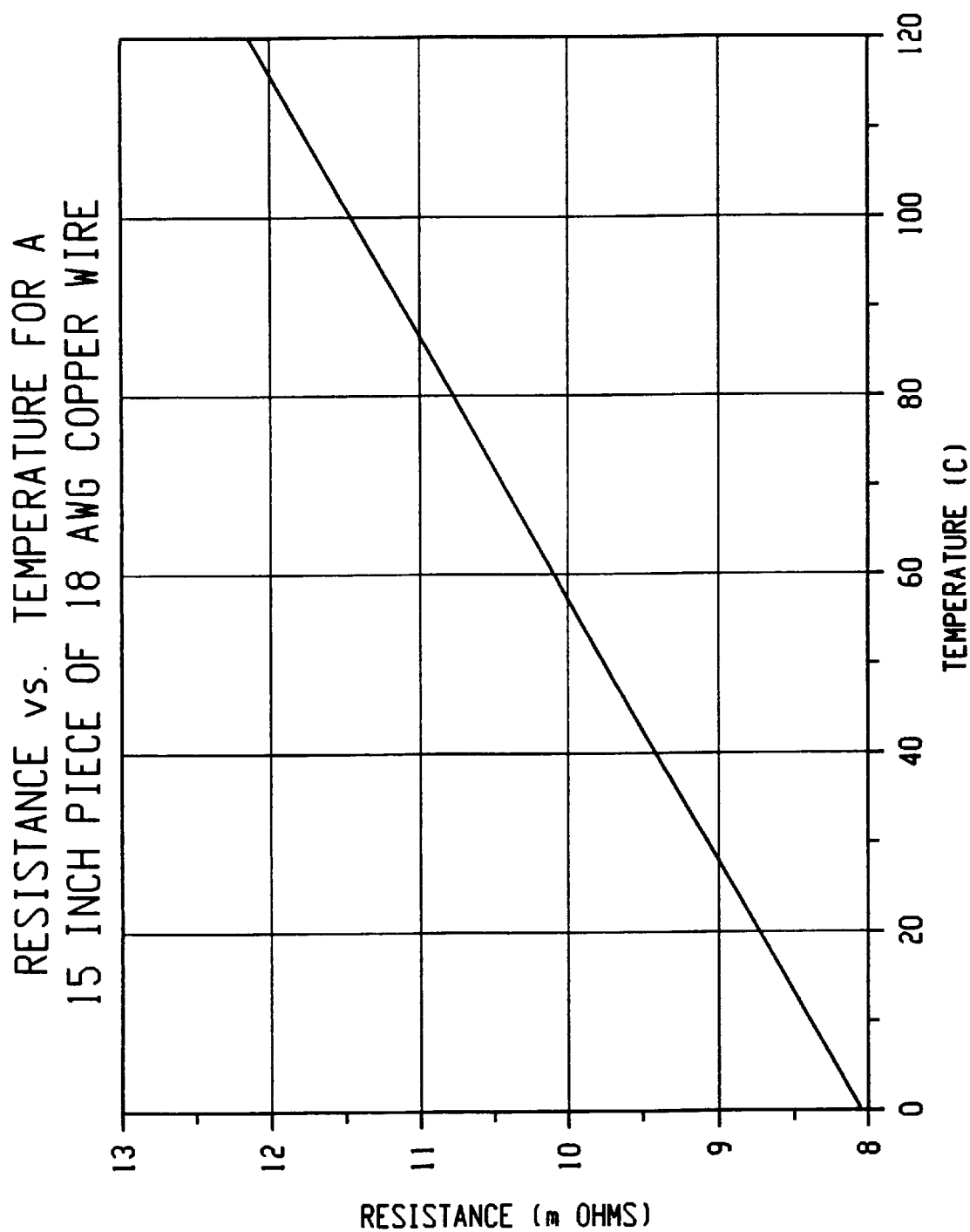
FIG. 4 is a graph showing the relationship between temperature and resistance for a sense resistor used in the circuit of the present application.

The current running through motor M correlates to the rotational speed of the motor as shown in FIGS. 2 and 3, and the same current runs through sense resistor 20. Therefore, measuring the voltage drop across sense resistor 20 is a way of measuring total motor current or a value that correlates to total motor current.

A line 22 connected at point 24 on the opposite side of sense resistor 20 from motor M terminates in an arrowhead 26 to designate a reference potential. All of the other arrowheads in the circuit of FIG. 1 are referenced to the same potential as arrowhead 26.

A line 28 is connected at point 30 between motor M and sense resistor 20. Line 28 is also connected to an amplifier A that amplifies the voltage across sense wire 20 for conversion to a dc voltage. The input voltage at the positive input of the operational amplifier is a sine wave in the millivolt range and the output is a positive pulsating dc voltage in the single digit volt range. Amplifier A includes an operational amplifier 34 for providing a voltage gain and an input impedance matching resistor 36. Amplifier A includes resistors 38, 40 that set the amount of voltage gain provided by the amplifier.

A peak detector B connected to the output of amplifier A by line 42 converts the pulsating positive dc voltage from amplifier A to a steady dc voltage. The magnitude of the steady dc voltage is close to the peak of the pulsating dc voltage from amplifier A and correlates to the speed of motor M.

Peak detector B includes a capacitor 46 that filters the positive pulsating voltage into a steady dc voltage. A diode 48 prevents capacitor 46 from discharging back into amplifier A. Resistor 50 provides a controlled discharge path for capacitor 46. Zener diode 52 clamps peak detector B to the desired voltage value. Resistor 54 is an input impedance matching resistor. The output of peak detector B is connected by line 58 to the positive input of a comparator C having an operational amplifier 60 that is used as a comparator.

Comparator C is also connected by line 64 to a voltage reference D that is connected to line L1 by line 66 and supplies a reference signal to the negative input of comparator C. The reference signal input to comparator C by voltage reference D varies in magnitude with variations in the magnitude of line voltage. Voltage reference D includes resistors 70, 72 that form a voltage divider to reduce the magnitude of line voltage to a predetermined ratio of the line voltage. Diode 74 rectifies a sine wave into a positive pulsating dc voltage. Capacitor 76 filters the positive pulsating voltage into a steady dc voltage and resistor 78 provides a controlled discharge path for capacitor 76.

A dc power supply E connected to line L1 converts ac line voltage to a dc power supply for circuit components requiring a dc voltage. A dc voltage 80 provided by dc power supply E is connected to other circuit components as indicated at 80a, 80b, 80c and 80d. Power supply E includes a diode 82 that rectifies line voltage into a positive pulsating dc voltage. Resistor 84 is a current limiting and voltage dropping resistor. Zener diode 86 clamps the dc voltage to the desired value. Capacitor 88 filters the positive pulsating voltage into a steady dc voltage at 80.

An inverter F is provided to invert the output of comparator C by using an inverting comparator 90. Line 92 connects the output of comparator C to the negative input of inverting comparator 90. Line 94 connects the output of inverting comparator 90 to the negative input of comparator amplifier 60 through line 64.

When the output of comparator C goes low, the negative input through line 92 to the negative input of inverting comparator 90 drops below the regulated reference input on line 96 to the positive input of inverting comparator 90 and inverting comparator 90 goes high. Capacitor 98 in line 94 provides hysteresis so that when the output of inverter F goes high, capacitor 98 pulls the negative input of comparator C higher. This helps to prevent chattering of comparator C during switching, i.e., when operating amplifier 60 changes states. When the output of inverter F goes low, capacitor 98 pulls the negative input of comparator C lower and helps prevent chattering of comparator C when changing to its opposite state.

Inverter F includes an input impedance matching resistor 102 at the negative input to inverting comparator 90. An input impedance matching resistor 104 is provided for the positive input to inverting comparator 90. Numeral 106 identifies a current limiting resistor. Zener diode 110 clamps the positive input to inverting comparator 90 to a desired dc voltage value and sets the reference voltage for comparator/ inverter F.

A gain adjuster H is provided for adjusting the gain of amplifier A. When start winding 14 is active, there is a different relationship between motor current and motor speed compared to when start winding 14 is inactive as shown in FIGS. 2 and 3. The purpose of gain adjuster H is to adjust the gain of amplifier A to achieve proper switching points for activating or deactivating start winding 14.

When comparator C goes high to activate start winding 14, npn transistor 120 of gain adjuster H is off because the output from comparator C on line 122 is also input on line 92 to the negative input of inverter F and the output of inverter F on line 124 goes low so that transistor 120 remains off. This is because the input on line 92 to the negative input of inverting comparator 90 is high and above the zener-regulated reference input on line 96 to the positive input of inverting comparator 90 so that its output remains low. Under these conditions, gain adjuster H is inoperative while start winding 14 is active so there is no adjustment in the gain.

When start winding 14 is off, the output on line 122 from comparator C goes low and the negative input to inverting comparator 90 on line 92 is below the reference input on line 96 to the positive input of inverting comparator 90. This causes the output of inverting comparator 90 to go high and provide an output on line 124 to turn transistor 120 on. Resistor 126 of gain adjuster H is then connected in parallel with resistor 40 of amplifier A and this provides a higher voltage gain for amplifier A due to the relationship between resistors 40 and 126. When transistor 120 if off, resistor 126 has no effect on amplifier A. Resistor 128 is a current limiting resistor for the base of transistor 120.

An electronic switch J is connected to output line 122 from comparator C. When comparator C calls for activation of start winding 14, the output of amplifier 60 goes high to turn on a logic triac 140 that is used as a predriver for turning on a high current snubberless triac 142 in series with start winding 14. When comparator C calls for start winding 14 to be deactivated, the output of amplifier 60 goes low and turns off logic triac 140 which in turn causes high current snubberless triac 142 to turn off.

Electronic switch J includes a current limiting resistor 144 that is used to drive the gate of logic triac 140. A pull down resistor 146 eliminates false triggering of logic triac 140. Current limiting resistor 148 limits the amount of current flow into the gate of high current snubberless triac 142. Logic triac 140 requires substantially less gate drive current than high current snubberless triac 142.

The voltage drop across sense resistor 20 provides a sensed value that is monitored and modified by amplifier A and peak detector B to provide a sensed input to comparator C that is compared with a reference input from voltage reference D. When the sensed input on line 58 to the positive input of operational amplifier 60 in comparator C exceeds the reference input on negative input line 64 to operational amplifier 60, the output of operational amplifier 60 goes high and closes electronic switch J to activate start winding 14. When the sensed input is lower than the reference input, the comparator output goes low to deactivate the start winding.

The magnitude of the output from peak detector B correlates to motor current because the voltage drop across sense resistor 20 correlates to motor current which in turn correlates to motor speed as shown in FIGS. 2 and 3. The magnitude of the reference voltage provided by voltage reference D to the negative input of comparator amplifier 60 on line 64 correlates to the magnitude of line voltage or motor power supply voltage. These relationships help to provide improved accuracy in the motor rpm trip points at which start winding 14 is activated and deactivated when changes in motor current are caused by line voltage variations.

When switch 10 is closed to energize motor M, the current running through main winding 16 increases until the voltage drop across sense resistor 20 is sufficient for amplifier A and peak detector B to provide a sensed value input to comparator C that is greater than the reference value input from voltage reference D. The output of comparator C then goes high and turns on triac 140 which will then turn on triac 142 to activate start winding 14. As the motor comes up to speed, the current running through the motor and sense resistor 20 decreases until the sensed value input from amplifier A and peak detector B to comparator C is less than the reference value input from voltage reference D. The output of comparator C then goes low and turn triacs 140, 142 off to deactivate start winding 14.

In one example, start winding 14 is activated when motor M is stopped or rotating at less than around 1,200 rpm, and is deactivated when motor M is rotating at around 1,300 rpm. When the start winding is deactivated, the motor ramps up to normal operating speed of say 1,600 rpm on the main winding. The gain of amplifier A is automatically adjusted by gain adjuster H according to whether the start winding is active or inactive to compensate for different motor currents as shown in FIGS. 2 and 3. The gain adjuster is on when the start winding is inactive and is off when the start winding is active. In other words, the gain adjuster is on when only the main winding is active, and is off when both the start and main windings are active. This provides the amplifier with higher gain when motor current is lower with only the main winding active as shown by the solid line curve in FIG. 2. When motor current is higher with both main and start windings active as shown by the dotted line curve in FIG. 2, the gain adjuster is off and the amplifier gain is lower.

The motor rpm trip points at which the start winding is deactivated and reactivated can be adjusted by changing the value of resistors 40 and 126 to modify the gain of amplifier A. By way of example, start winding 14 is activated or reactivated when motor speed is 0–1,200 rpm, and gain adjuster H is always turned off when the start winding is active. With reference to the dotted line curve of FIG. 2, suppose the comparator goes low to deactivate the start winding at a motor speed of around 1,300 rpm that corresponds to a motor current of about 24 amps. At the motor current of about 24 amps, the sensed value across sense resistor 20 provides a sensed value input to comparator C from amplifier A and peak detector B that is below the reference value input to the comparator from voltage reference D. This causes the comparator to go low and deactivate the start winding. The gain of amplifier A can be adjusted higher or lower when gain adjuster H is inoperative by changing the resistance value of resistor 40 to respectively increase or decrease the motor speed at which the start winding is deactivated. Increasing the amplifier gain would keep comparator C in its high state with the start winding remaining active at motor currents lower than 24 amps and motor speeds higher than 1,300 rpm. Decreasing the amplifier gain would deactivate the start winding at motor currents higher than 24 amps and motor speeds lower than 1,300 rpm.

The motor rpm trip points at which the start winding is reactivated when gain adjuster H is on can be adjusted by changing the resistance values of both resistors 40 and 126. When the comparator goes low to deactivate the start winding at a motor speed of around 1,300 rpm, gain adjuster H turns on and the motor current decreases from the dotted line curve in FIG. 2 to the solid line curve. The motor speed then continues to ramp up to a normal operating speed of say 1,600 rpm on the main winding only and gain adjuster H is on. If the motor load increases to a point requiring additional torque, such as by the motor speed decreasing to around 1,200 rpm corresponding to a current of about 19 amps on the solid line curve, the start winding will be reactivated and gain adjuster H will be turned off. At the motor current of about 19 amps, the sensed value across sense resistor 20 provides a sensed value input to comparator C from amplifier A and peak detector B that is above the reference value input to the comparator from voltage reference D. This causes the comparator to go high and activate the start winding. The gain of the amplifier while gain adjuster H is on can be adjusted higher or lower by changing the resistance values of both resistors 40 and 126 to respectively increase or decrease the motor speed at which the start winding is reactivated. Increasing the amplifier gain would reactivate the start winding at motor speeds higher than around 1,200 rpm corresponding to lower motor currents. Decreasing the gain would reactivate the start winding at lower motor rpm corresponding to higher motor current.

In summary, increasing the amplifier gain when only the main winding is active will reactivate the start winding at a reactivating trip point that corresponds to higher motor speeds and lower motor currents. Decreasing the amplifier gain when only the main winding is active will reactivate the start winding at a reactivating trip point that corresponds to lower motor speeds and higher motor currents. Increasing the amplifier gain when both the main and start windings are active will deactivate the start winding at a deactivating trip point that corresponds to higher motor speeds and lower motor currents. Decreasing the amplifier gain when both the main and start windings are active will deactivate the start winding at a deactivating trip point that corresponds to lower motor speeds and higher motor currents.

In the control circuit of the present application, sense resistor 20 functions as a sensed value generator by producing a voltage that varies with motor current and correlates to motor speed. This sensed value is converted by amplifier A and peak detector B to a sensed value input that is received by comparator C. Voltage reference D functions as a reference value generator to provide a reference value input to comparator C that correlates to motor power supply voltage. Comparator C is a start winding control or a start winding activator/deactivator that goes high to activate the start winding when the sensed value input is above the reference value input, and goes low to deactivate the start winding when the reference value input is above the sensed value input.

Providing different resistance values for resistors 40 and 126 in amplifier circuit A and gain adjuster circuit H adjusts the magnitude of the difference between the sensed value across sense resistor 20 and the sensed value input that is received by comparator C. This functions to adjust the magnitude of the motor current that will cause comparator C to go high or low, and provides an advantageous way of adjusting the motor speed trip points at which the start winding is deactivated and reactivated.

Increasing the amplifier gain provides upward adjustment in the motor speeds at which the start winding is reactivated and at which it is deactivated. This corresponds to downward adjustment in the magnitude of the motor currents at which the start winding is reactivated and at which it is deactivated. Increased amplifier gain increases the magnitude of the sensed value input, and also increases the magnitude of the difference between the sensed value that is derived from sense resistor 20 and the sensed value input at comparator C. Decreasing the amplifier gain provides downward adjustment in the motor speeds at which the start winding is reactivated and at which it is deactivated. This corresponds to upward adjustment in the magnitude of the motor currents at which the start winding is reactivated and at which it is deactivated. Decreased amplifier gain decreases the magnitude of the sensed value input, and also decreases the magnitude of the difference between the sensed value that is derived from sense resistor 20 and the sensed value input at comparator C.

The copper wire used for sense resistor 20 provides compensation for changes in motor current due to temperature variations. Motor current changes that are due solely to temperature variations do not appreciably affect motor rpm as will be evident from a comparison of FIGS. 2 and 3. At 25° C. in FIG. 2, the motor rpm is 1,000 at a main winding current of about 24 amps. At 130° C. in FIG. 3, the motor rpm is 1,000 at a main winding current of about 16 amps.

When the temperature rises within the motor, the current running through the motor decreases and sense resistor 20 compensates by also increasing in resistance. The combination of increasing resistance and decreasing current maintain a substantially constant voltage drop across sense resistor 20 with changes in motor current that are due to temperature variations and that do not appreciably affect motor rpm.

The compensation provided for the reference and sensed value inputs to the comparator with changes in motor current due to variations in motor power supply voltage and due to motor winding temperature variations maintains the motor speed within around 200 rpm of the desired motor rpm trip points at which the start winding is activated or deactivated.

In the control circuit of this application, amplifier A and peak detector B form a sensing circuit for sensing a value that correlates to motor current. The sensed value is the voltage drop across sense resistor 20 in a preferred embodiment. The sensing circuit defined by amplifier A and peak detector B provide a sensed input to a comparing circuit defined by comparator C.

Voltage reference D forms a reference value circuit that provides a reference value to the comparing circuit formed by comparator C. In a preferred arrangement, the reference value correlates to line voltage. The sensed and reference values are compared by the comparator which then goes high or low depending on whether the sensed input is higher or lower than the reference input. The comparator output turns the electronic switch on or off for activating and deactivating the start winding. The start winding is activated when the sensed value exceeds the reference value, and is deactivated when the reference value exceeds the sensed value. Obviously, other arrangements could also be provided.

Motor current is high when the motor is initially turned on, and also when the motor is under a load that causes a substantial reduction in motor speed. The high current provides a high sensed value and a high sensed value input to the comparator that is higher than the reference value input so that the comparator goes high to activate the start winding. When the motor is up to speed, motor current decreases to provide a reduced sensed value and a reduced sensed value input that is lower than the reference value input so that the comparator goes low to deactivate the start winding.

A principal concept of the present application is to sense motor speed by sensing motor current for use in controlling the motor start winding. The preferred arrangement uses a predetermined length wire as a sense resistor to sense motor current. However, it will be appreciated that motor current can be sensed in other ways, such as the use of a current transformer, a Hall effect sensor or other current sensing devices. It will also be recognized by those skilled in the art that the triacs for the electronic switch could be replaced by solid state relays of either zero or non-zero crossing types. Instead of triacs or solid state relays, it is also possible to use zero crossing detectors or circuits, as well as opto-isolated triacs. It will further be recognized that the discrete analog components shown and described in FIG. 1 could be replaced by, and incorporated in, an application specific integrated circuit. Obviously, the control circuit could also be a microcontroller with appropriate associated software for performing the described control functions in response to sensed motor current.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only the scope of the claims.

We claim:

1. A control circuit for an electric motor having start and run windings, said control circuit providing improved accuracy in motor rpm trip points at which a motor start winding is activated and deactivated by compensating for changecs in motor current due to variations in motor power supply voltage a nd due to variations in motor winding temperature, said control circuit including an electronic switch that activates and deactivates said start winding at predetermined motor rpms, a sense resistor in series with said motor, a voltage drop monitor that monitors the voltage drop across said sense resistor that is produced by motor current running through said sense resistor to provide a sensed value that is correlated to motor current, said sensed value remaining substantially constant with variations in motor current caused by variations in motor winding temperature, a motor power supply monitor that monitors motor power supply voltage and provides a reference value that is correlated to motor power supply voltage, both of said sensed and reference values varying substantially proportionally with variations in power supply voltage, a comparator that compares said sensed and reference values and provides a comparator output that varies in accordance with whether said sensed value is higher or lower than said reference value, and said comparator output providing operation of said electronic switch to activate and deactivate said start winding at predetermined values of motor current that are correlated to the motor rpm trip points.

2. The control circuit of claim 1 wherein said sense resistor is exposed to the temperature environment of the motor windings.

3. The circuit of claim 1 wherein said comparator output changes between high and low states to activate and deactivate the motor start winding, said control circuit providing said comparator with a reference input that correlates to said reference value and with a sensed input that correlates to said sensed value, and said comparator output being in one of said high and low states when said reference input is greater than said sensed input and being in the other of said high and low states when said reference input is less than said sensed input.

4. The control circuit of claim 1 wherein said sense resistor comprises a length of wire positioned for exposure to substantially the same temperature environment as the motor windings.

5. The control circuit of claim 1 including an amplifier that converts said sensed value to a sensed value input that is received by said comparator.

6. The control circuit of claim 5 wherein the motor rpm trip points are correlated to the magnitude of said sensed value input, and the motor rpm trip points are adjustable by adjusting the gain of said amplifier to adjust the magnitude of said sensed value input.

* * * * *